(12) United States Patent
Gonzales Sanz et al.

(10) Patent No.: US 8,671,977 B2
(45) Date of Patent: Mar. 18, 2014

(54) CONTAINER ASSEMBLY FOR WINDSHIELD AND HEADLIGHT WASHING FLUID IN A VEHICLE

(75) Inventors: Mariano Gonzales Sanz, Mollet del Vallès (ES); Miguel Mota Lopez, Mollet del Vallès (ES)

(73) Assignee: Fico Transpar, S.A., Mollet del Valles, Barcelona (ES)

(*) Notice: Subject to any disclaimer, the term of this patent is extended or adjusted under 35 U.S.C. 154(b) by 1025 days.

(21) Appl. No.: 12/374,695

(22) PCT Filed: Jul. 24, 2007

(86) PCT No.: PCT/IB2007/002098
§ 371 (c)(1),
(2), (4) Date: Nov. 2, 2009

(87) PCT Pub. No.: WO2008/012643
PCT Pub. Date: Jan. 31, 2008

(65) Prior Publication Data
US 2010/0051122 A1    Mar. 4, 2010

(30) Foreign Application Priority Data
Jul. 25, 2006 (ES) .................................. 200602029

(51) Int. Cl.
*B65D 6/24* (2006.01)
*B65D 8/12* (2006.01)
*B65D 8/14* (2006.01)

(52) U.S. Cl.
USPC ........ 137/565.17; 220/666; 222/96; 222/105; 222/106; 239/328

(58) Field of Classification Search
USPC ................. 137/565.17; 222/95, 96, 106, 107; 220/666; 138/106, 107; 239/328
See application file for complete search history.

(56) References Cited

U.S. PATENT DOCUMENTS

| 4,456,171 A | * | 6/1984 | Friedl | ...................... 237/12.3 C |
| 4,846,510 A | | 7/1989 | Mikol | |

(Continued)

FOREIGN PATENT DOCUMENTS

| DE | 198 11 019 A1 | 9/1999 |
| DE | 10 2004 024 950 A1 | 12/2005 |

(Continued)

OTHER PUBLICATIONS

International Search Report for PCT International Application No. PCT/IB2007/002098 mailed Jan. 23, 2008.

*Primary Examiner* — Craig Schneider
*Assistant Examiner* — Atif Chaudry
(74) *Attorney, Agent, or Firm* — RatnerPrestia

(57) ABSTRACT

A container assembly for windshield or headlight washing fluid in a vehicle. It includes in combination: an elongated hollow structure demarcated by a wall with a plurality of asymmetric accordion folds that can be arranged in a stable retracted position and in a flexible extended position, in which it is suitable for being installed in a useful space of an engine compartment in the vehicle, the hollow structure in the extended position containing an operational amount of windshield or headlight washing fluid; a filling opening located at an inlet end portion of the hollow structure; at least one pump associated to the hollow structure for transferring contained fluid to a service point; and a securing device for securing the inlet end portion and one or more sections of the hollow structure to the engine compartment in an installation area.

12 Claims, 8 Drawing Sheets

(56) References Cited

U.S. PATENT DOCUMENTS

| | | | |
|---|---|---|---|
| 4,927,191 A * | 5/1990 | Mikol | 285/226 |
| 5,979,326 A * | 11/1999 | Ohinata | 101/494 |
| 6,311,936 B1 * | 11/2001 | Herr et al. | 248/75 |
| 6,363,905 B1 * | 4/2002 | Davis | 123/196 R |
| 7,118,050 B1 * | 10/2006 | Chen | 239/328 |

FOREIGN PATENT DOCUMENTS

| | | |
|---|---|---|
| EP | 1 571 047 A1 | 9/2005 |
| EP | 1571047 A1 * | 9/2005 |
| FR | 2 867 127 | 9/2005 |
| JP | 62-286863 | 12/1987 |
| JP | 2004-291838 | 10/2004 |

* cited by examiner

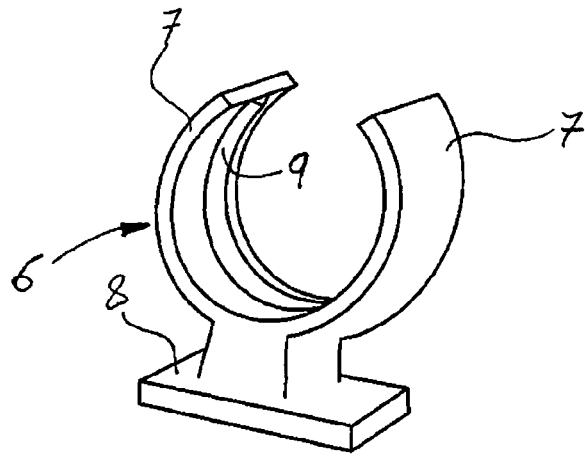
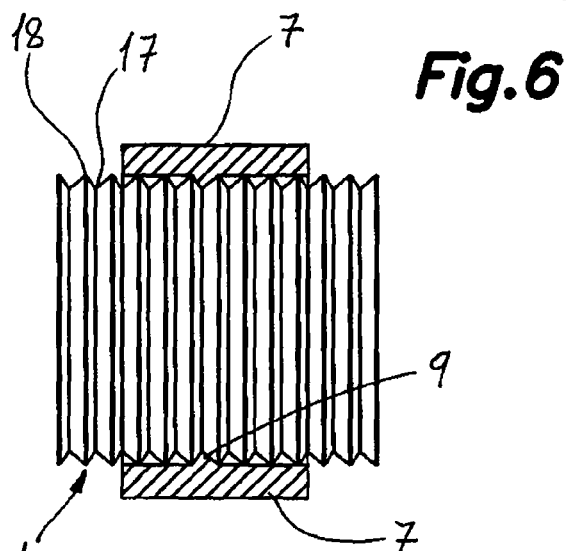
Fig.6
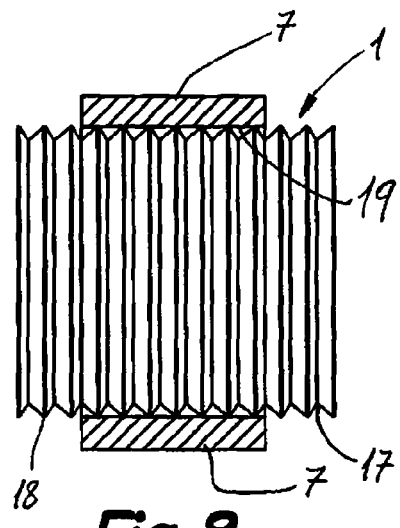
Fig.7
Fig.8
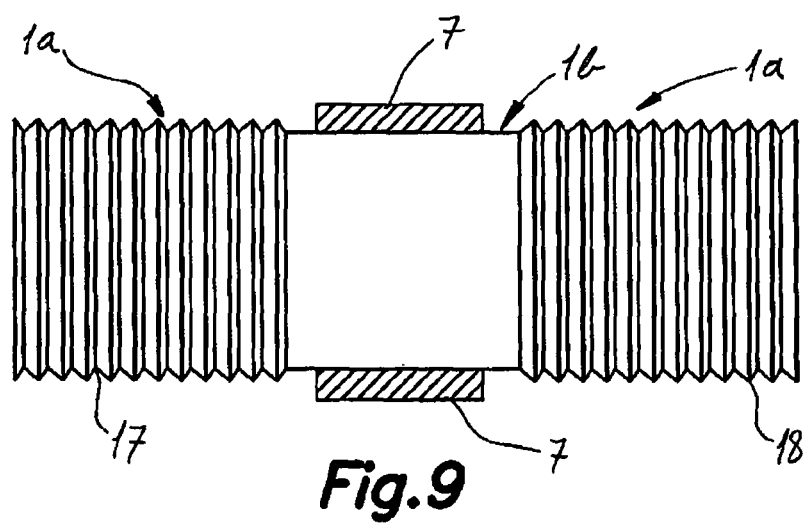
Fig.9

CONTAINER ASSEMBLY FOR WINDSHIELD AND HEADLIGHT WASHING FLUID IN A VEHICLE

This application is a U.S. National Phase Application of PCT International Application No. PCT/IB2007/002098, filed Jul. 24, 2007.

TECHNICAL FIELD

The present invention relates to a container assembly for windshield or headlight washing fluid in a vehicle, including an extensible tank associated to a motor-driven pump and securing means for fixing the container assembly to the engine compartment of a vehicle for example.

When reference is made herein to a container for headlight washing fluid, it will be implicitly understood that the container must supply both a windshield and a headlight washing device.

BACKGROUND OF THE INVENTION

Patent document JP-A-2004291838 describes a tank for windshield washing fluid formed from a tubular portion with accordion folds closed at its ends by a front wall and a rear wall, such that it can contract in the front-rear direction without breaking when it receives an impact. The solution described in this patent imposes an arrangement for assembling the tank in the engine compartment, or a very specific application and it does not describe or suggest that the tubular portion with accordion folds can adopt a compact, stable retracted position that is suitable for saving space during storage or transport, for example.

Patent document EP-A-1571047 describes a tank for windshield washing fluid constructed from a first rigid main tank portion, in which there is arranged a pump for driving the fluid, extended by a second expandable auxiliary tank portion provided with accordion folds. The two rigid and expandable tank portions are supported on a rack with a suitable extensible part for adapting the expansion or retraction of the auxiliary tank portion in relation to the main tank portion, providing a tank with a variable volume. The proposed solution again imposes a very specific and/or limited location area or arrangement in the engine compartment and does not describe or suggest that the accordion folds allow the auxiliary tank portion to adopt a compact, stable retracted position, and does not provide or suggest a flexible structure which can adapt to reduced non-linear spaces.

Patent document JP-A-62286863 describes a rigid tank for detergent fluid in a vehicle. The rigid tank is provided with a filling tube with a wall formed by a plurality of accordion folds providing it with flexibility. The flexible filling tube does not act as a tank rather it only has the function of leading the fluid from the filling opening to the rigid tank during a filling operation.

The structure of a tube with folds in the form of an accordion is known, although in other fields of the art, patent documents U.S. Pat. No. 4,846,510 and U.S. Pat. No. 4,927,191 being among them. The mentioned patents describe several applications, for example, such as a flexible connecting tube, a trap drain, a retractable neck for a container (in a manner similar to the aforementioned JP patent document), and even a body of a folding container with a small height; However, these patent documents do not describe or suggest such an adjustable structure in association to a pump for the construction of a suitable flexible elongated tank for containing windshield or headlight washing fluid in a vehicle.

Patent document DE-A-19811019 relates to a conduit for windshield washing fluid comprising a manifold with several corrugated portions separated by several smooth sections and with leak-tight coupling means associated to both ends. Like other background documents, it always describes the fluid guiding or circulating functionality through the mentioned conduit and by no means does it describe its possible use for fluid storage and its possible association to a pump.

The present invention provides a new structure concept for a windshield or headlight washing fluid tank or container that is especially favorable as regards manufacturing, logistics and assembly in a vehicle engine compartment.

DISCLOSURE OF THE INVENTION

The present invention provides a container assembly for windshield or headlight washing fluid in a vehicle, comprising an elongated hollow structure with a plurality of asymmetric accordion folds formed therein, thanks to which said hollow structure can be arranged in a stable retracted position and in a flexible extended position. When the hollow structure is in the mentioned flexible extended position, it is suitable for being installed inside an engine compartment in said vehicle. The hollow structure in said extended position is sized to be able to contain an operational amount of windshield or headlight washing fluid and given its flexibility and elongation, it can be located in very small or unaligned spaces. The container assembly comprises a filling opening located in an inlet end portion of the hollow structure and generally (although other variants are contemplated) an outlet port located in an outlet end portion of the hollow structure.

In a preferred implementation, the container assembly further includes a pump support joined to said outlet end portion and adapted to support a motor-driven pump such that a suction inlet of said motor-driven pump is communicated with the outlet port. Securing means are arranged to secure said inlet end portion and said pump support to the engine compartment with the filling opening at a higher lever than the outlet port, and a plurality of securing devices have been provided adapted to secure several portions of the hollow structure located between the filling opening and the outlet port to the engine compartment, such that stability of the container is ensured when the vehicle is moving and is subjected to speed variations (accelerations and braking).

The container assembly proposed by the present invention has several advantages. Firstly, when the container assembly is not installed in the vehicle, it can be arranged in a substantially compact and stable retracted position, requiring much less space for storage and transport tasks compared to rigid tubes and tank assemblies. Furthermore, when the extendible tank of the container assembly of the present invention is in an extended configuration, it is extraordinarily flexible and can be easily adapted to the available spaces in the engine compartment of each vehicle, which allows making use of relatively narrow spaces which are not necessarily aligned with one another and which otherwise would not be used. For this same reason, reserving space for the windshield or headlight washing fluid tank can virtually be forgotten in the vehicle design stage, and a single model of the container assembly of the present invention can easily be adapted to different vehicle models. In addition, the container assembly of the present invention, except for the securing devices, can be integrated in a single part designed for the purpose of being obtained by extruding and/or blowing a plastic material, which is an additional advantage as regards the simplification of the manufacture, storage, transport, installation and maintenance or replacement.

BRIEF DESCRIPTION OF THE DRAWINGS

The previous and other features and advantages will be more fully understood from the following detailed description of several embodiments with reference to the attached drawings, in which:

FIG. 6 shows a perspective view of a securing device forming part of the container assembly of FIG. 1;

FIG. 7 shows a partial sectioned view schematically showing the coupling of the securing device of FIG. 6 to the hollow body of the container assembly of FIG. 1;

FIG. 8 shows a partial sectioned view schematically showing the coupling of another variant of the securing device to the hollow body;

FIG. 9 shows a partial sectioned view schematically showing the coupling of another variant of the securing device to the hollow body for an embodiment thereof including several smooth intermediate sections;

DETAILED DESCRIPTION OF EXEMPLARY EMBODIMENTS

Figures 1, 2:
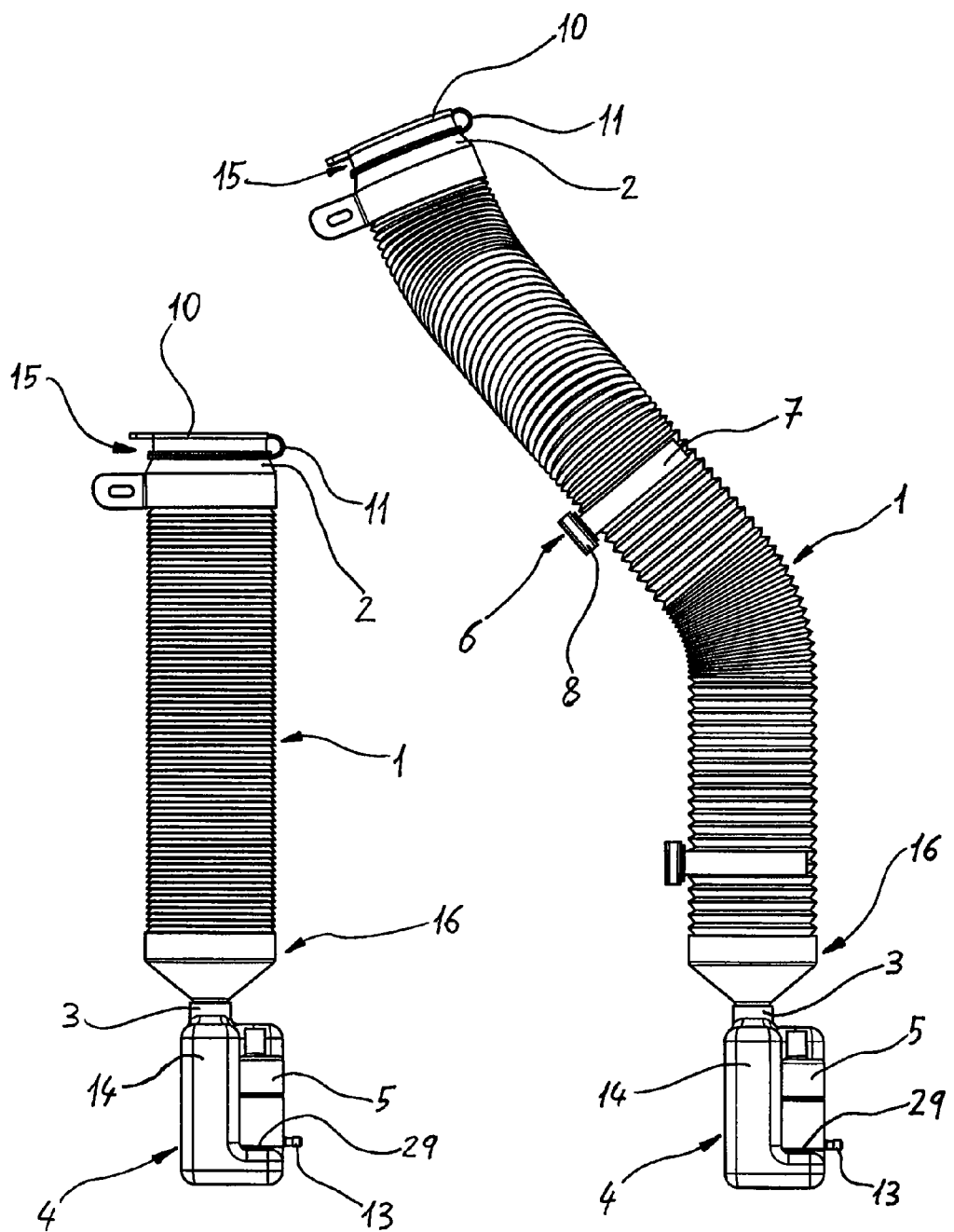
FIG. 1 shows an elevational view of a container assembly for windshield or headlight washing fluid in a vehicle according to an embodiment of the present invention in a stable retracted position, for storage or transport for example.
FIG. 2 shows a side elevational view of the container assembly of FIG. 1 in a flexible extended position.
Figure 5:
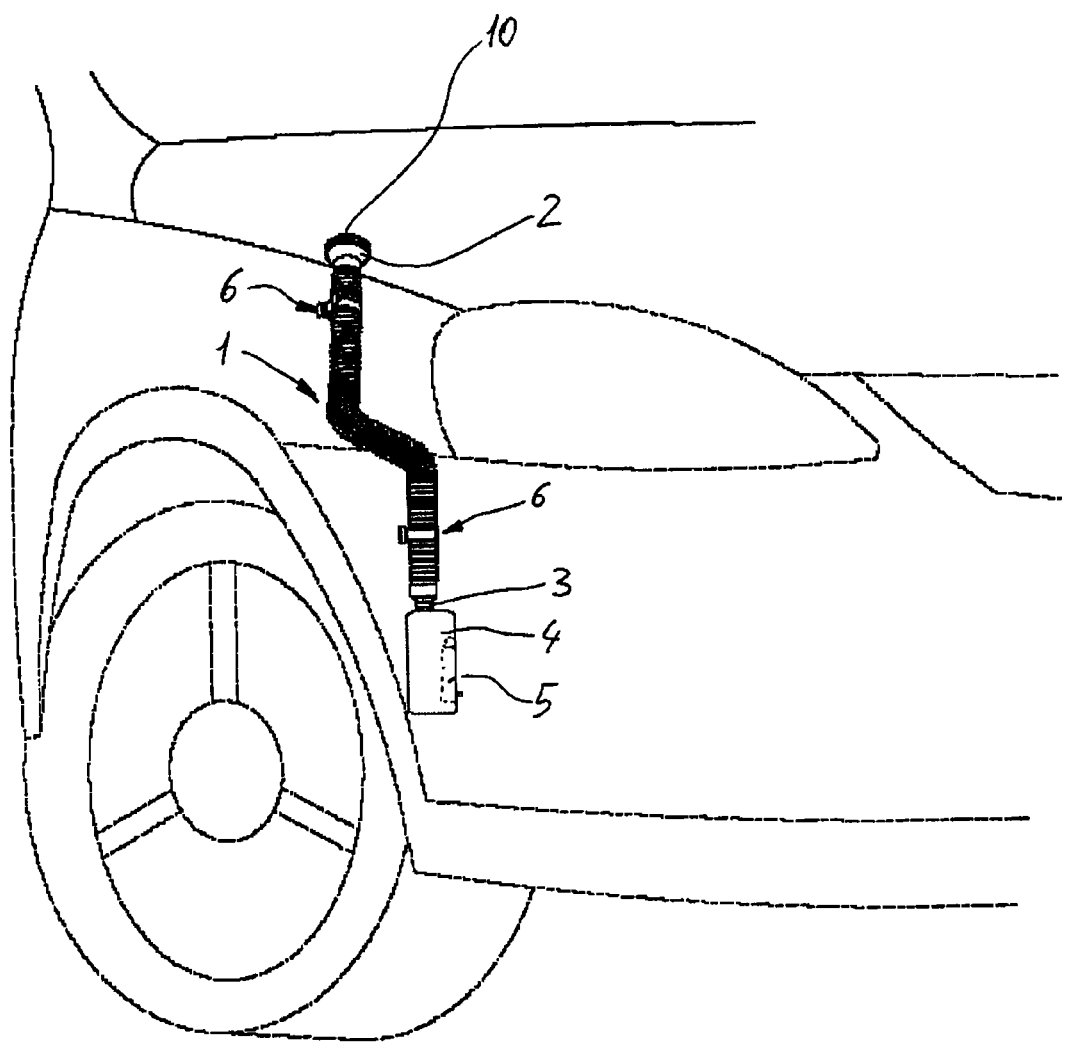
FIG. 5 shows a schematic view showing an example of the installation of the container assembly of FIG. 1 in the engine compartment of a vehicle.

With reference first to FIGS. 1 and 2, they show a container assembly for windshield or headlight washing fluid according to an embodiment of the present invention, which basically comprises a flexible and extensible hollow structure 1, a pump support 4 joined to an end of said tubular structure and several securing devices 6, said contained being provided to be incorporated to a windshield or headlight washing system of a vehicle. The mentioned hollow structure 1 comprises a plurality of asymmetric accordion folds formed therein, thanks to which the hollow structure 1 can be arranged in a retracted position shown in FIG. 1 or in an extended position shown in FIG. 2. When the hollow structure 1 is in the retracted position, it adopts a compact reduced configuration suitable for storage and transport. When the hollow structure 1 is in the extended position, it becomes significantly flexible and is suitable for being installed inside an engine compartment in said vehicle (FIG. 5). The hollow structure 1 in said extended position has sufficient capacity to house an operational amount of windshield or headlight washing fluid. "Operational amount" is understood as the amount that manufacturers usually foresee for windshield or headlight washing fluid tanks. For example, when the hollow structure 1 is adapted for a headlight washing system, it can have, in the extended position, a capacity comprised between 2.5 and 5 liters of fluid. If the hollow structure 1 is intended for a windshield washing system, it can have, in the extended position, a capacity comprised between 2.5 and 3 liters of fluid.

In the embodiment shown in FIGS. 1 to 4, the hollow structure 1 has a filling opening 2 located in inlet end portion 15 of the hollow structure 1 and an outlet port 3 located in outlet end portion 16 of the hollow structure 1. The mentioned pump support 4 is joined to said outlet end portion 16 of the hollow structure 1. The pump support 4 is adapted to support a motor-driven pump 5 such that a suction inlet 12 of said motor-driven pump 5 is communicated with the outlet port 3. In the embodiments shown, the pump support includes a receptacle 14 in which the outlet port 3 of the hollow body 1 ends up, and the suction inlet 12 of the motor-driven pump 5 is connected to an outlet of said receptacle 14. The motor-driven pump 5 has a drive outlet 13 connected to a conduit device of the windshield or headlight washing system. The pump support 4 preferably comprises elastic configurations 29 adapted to receive and hold the motor-driven pump 5, for example by snap fitting with optional elastic deformation, and the outlet of the receptacle 14 is adapted to receive the coupling of said suction inlet 12 of the motor-driven pump 5 by pressure coupling with a sealing gasket.

The inlet end portion 15 and generally the pump support 4 include securing means to secure the container assembly to the engine compartment of the vehicle with the filling opening 2 at a higher level than the outlet port 3. The container assembly further includes a plurality of securing devices 6 adapted to secure several portions of the hollow structure 1 located between the filling opening 2 and the outlet port 3 to the engine compartment. The number of such securing devices 6 can vary depending on the length and configuration of the hollow structure 1, and in any case, it will be a number that is enough to secure the hollow structure 1 in place, suitably locking it and minimizing stress (due to fluid pressure) on the wall of the container when the container assembly is full of liquid and subjected to the characteristic accelerations of a moving vehicle.

According to an embodiment, the hollow structure 1, the inlet end portion 15, the outlet end portion 16 and the pump support 4 including the receptacle 14 are integrated in a single part, which can be designed for the purpose of being obtained by extruding and/or blowing a plastic material. However, according to another embodiment (not shown), the hollow structure 1, the inlet end portion 15 and the outlet end portion 16 are integrated in one part and the pump support 4 including the receptacle 14 is another separate part. The hollow structure 1, the inlet end portion 15, the outlet end portion 16 and the pump support 4 including the receptacle 14 can alternatively be separate parts. The inlet end portion 15 is adapted to receive a lid 10 connected to the inlet end portion 15 of the hollow structure 1 by a connecting bead 11. This lid 10 and its connecting bead 11 can also be advantageously integrated in the single part forming the container assembly or, if such were the case, in the single part integrating the hollow structure 1, the inlet end portion 15, and the outlet end portion 16, or simply in the inlet end portion 15.

As shown in FIGS. 6 and 7, each of said securing devices 6 comprises a flange which can at last partly encircle a section of the hollow structure 1 and a base 8 adapted to be fixed to the engine compartment. The flange of the securing device 6 comprises a pair of elastic arms 7 adapted to receive and secure by snap fitting with elastic deformation a section of the hollow structure 1 in which said asymmetric accordion folds are formed. The mentioned asymmetric accordion folds of the hollow structure 1 comprise valleys 17 and peaks 18. The arms 7 are configured with inner ribs 9 adapted to at least partly be inserted in one or more of said valleys 17, thereby preventing the possible sliding of the arms 7 over the peaks of the folds. Alternatively, as shown in FIG. 8, the arms 7 have a smooth inner surface 19 adapted to be supported on the mentioned peaks 18 of the folds of the hollow structure 1. Optionally, in an embodiment shown in FIG. 9, the hollow structure 1 can comprise smooth sections 1*b* arranged between sections with asymmetric accordion folds 1*a*, the smooth sections 1*b* having smaller transverse dimension than the maximum transverse dimension in the sections with folds 1*a*, and the elastic arms 7 of the flanges of the securing devices 6 are adapted to be coupled to the smooth sections 1*b* of the hollow structure 1 by snap fitting with elastic deformation.

Alternatively, according to an embodiment not shown, the container can comprise a single securing device 6 including a base adapted to be fixed to the engine compartment and several spaced flanges which can at least partly encircle several sections of the hollow structure. Another variant of said only securing device 6 could include one or more wedge-shaped configurations joined to the base, which can at least partly encircle several sections of the hollow structure 1.

In the embodiment shown in FIGS. 1 and 2, the hollow body has a profile of circular cross section. However, the hollow body 1 of the present invention can be configured differently, for example, with an oval or polygonal cross section.

Figures 3, 4:
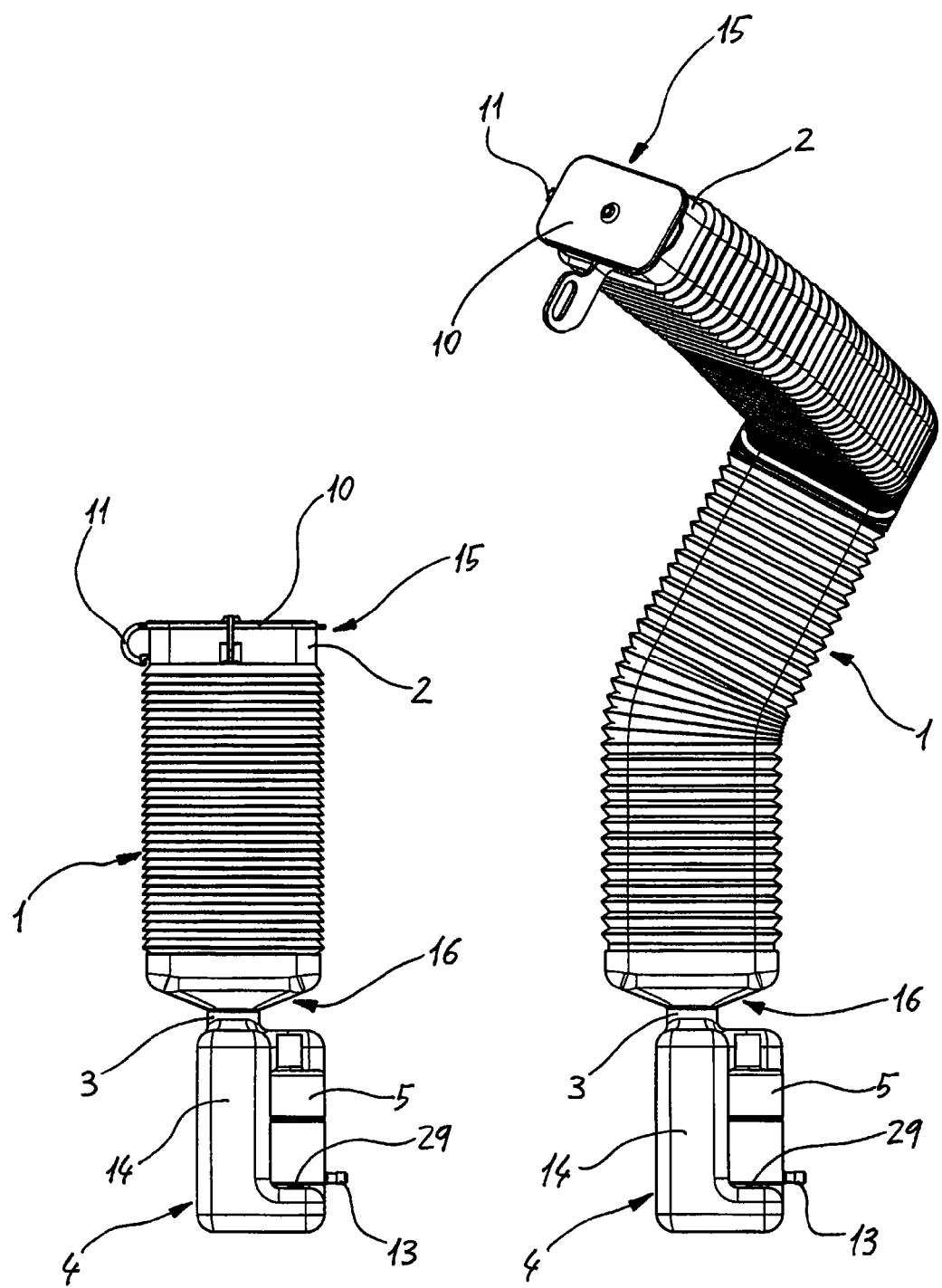
FIG. 3 shows an elevational view of a container assembly for windshield or headlight washing fluid in a vehicle according to another embodiment of the present invention in a stable retracted position.
FIG. 4 shows a side elevational view of the container assembly of FIG. 3 in a flexible extended position.

FIGS. 3 and 4 show a container assembly according to the present invention which is completely similar to the one described above in relation to FIGS. 1 and 2, except in that the cross section profile of the hollow body 1 is rectangular rather than circular. Accordingly, the inlet end portion 15, the lid 10 and the outlet end portion 16 have a rectangular configuration to match. The flanges of the securing devices are adapted to such rectangular configuration. The pump support 4 and the receptacle 14 are similar to those described above.

Figure 10:
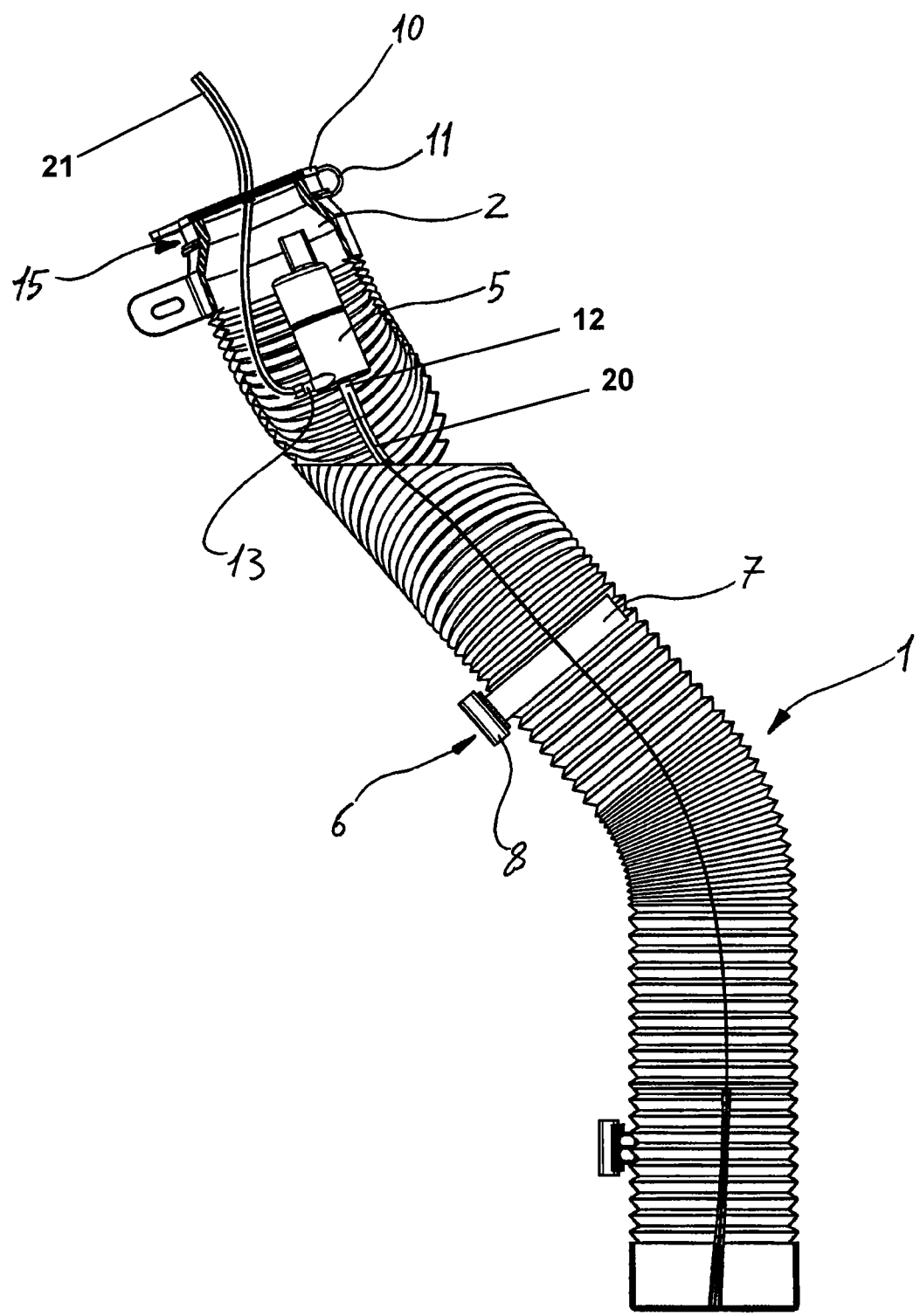
FIG. 10 shows a side elevational view with a partial section of an implementation variant which is only distinguished by the arrangement of the pump inside the structure next to its filling opening.
Figure 11:
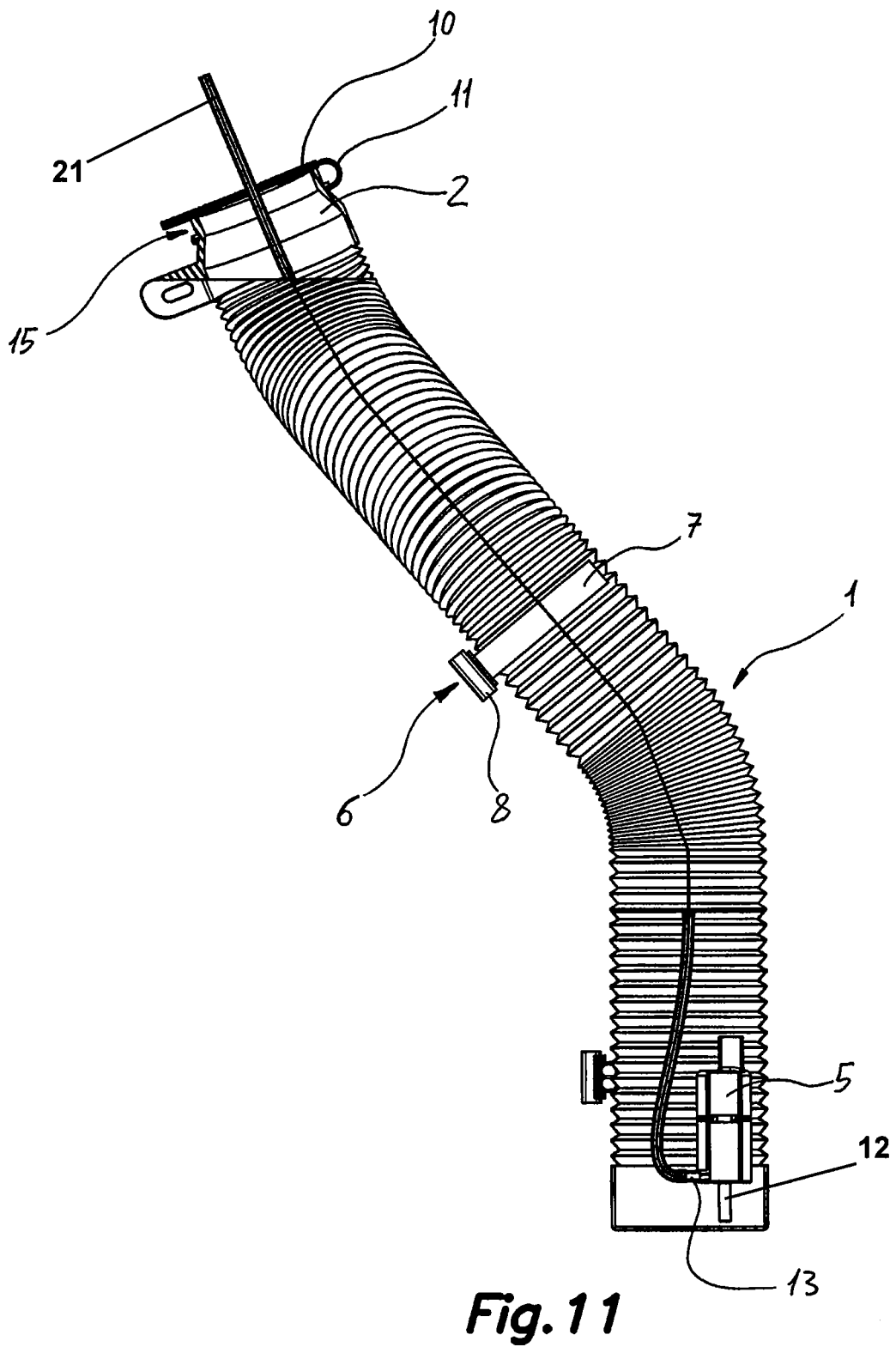
FIG. 11 is equivalent to the previous view and shows another implementation example in which the pump is arranged immersed inside the structure next to the distal end of the filling opening of the container.
Figure 12:
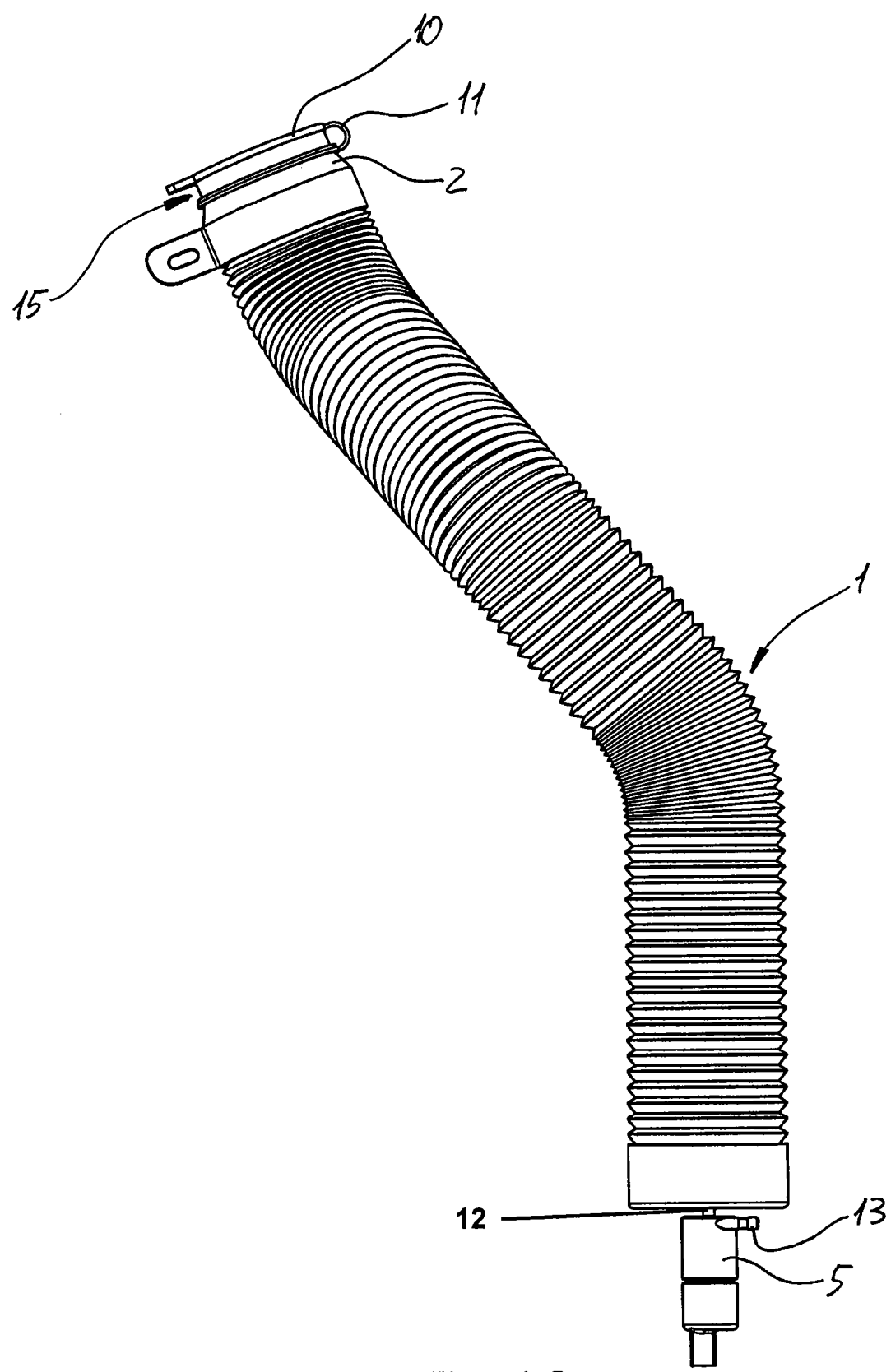
FIG. 12 also shows an elevational view of the hollow structure proposed with a third alternative example of assembling the pump directly connected to an outlet port in a distal end of the filling opening.

FIGS. 10, 11 and 12 show alternative assembly variants for the pump 5 connected to the tubular structure 1, maintaining the basic features of the proposed invention.

In FIG. 10 said pump 5 is fixed, inside said hollow structure (1), next to the mentioned inlet opening 2, a suction tube 20 connected a said suction intake 12 deriving from the pump 5, said tube 20 extending to the distal end, or bottom of the container.

In FIG. 11 the pump 5 is installed inside the hollow structure 1 and is a pump which operates immersed, fixed next to the distal end of the structure or bottom of the container. The figure shows the suction inlet 12 of the pump 5 in the bottom of the container and a manifold 21 (extending throughout the container and exiting through its filling opening), connected to the discharge outlet 13 of said pump 5.

In FIG. 12, the pump 5 is attached to said hollow structure 1, a suction intake 12 of the pump 5 being directly connected to an outlet port 3 defined at the distal end of the structure.

Figures 13, 13A:
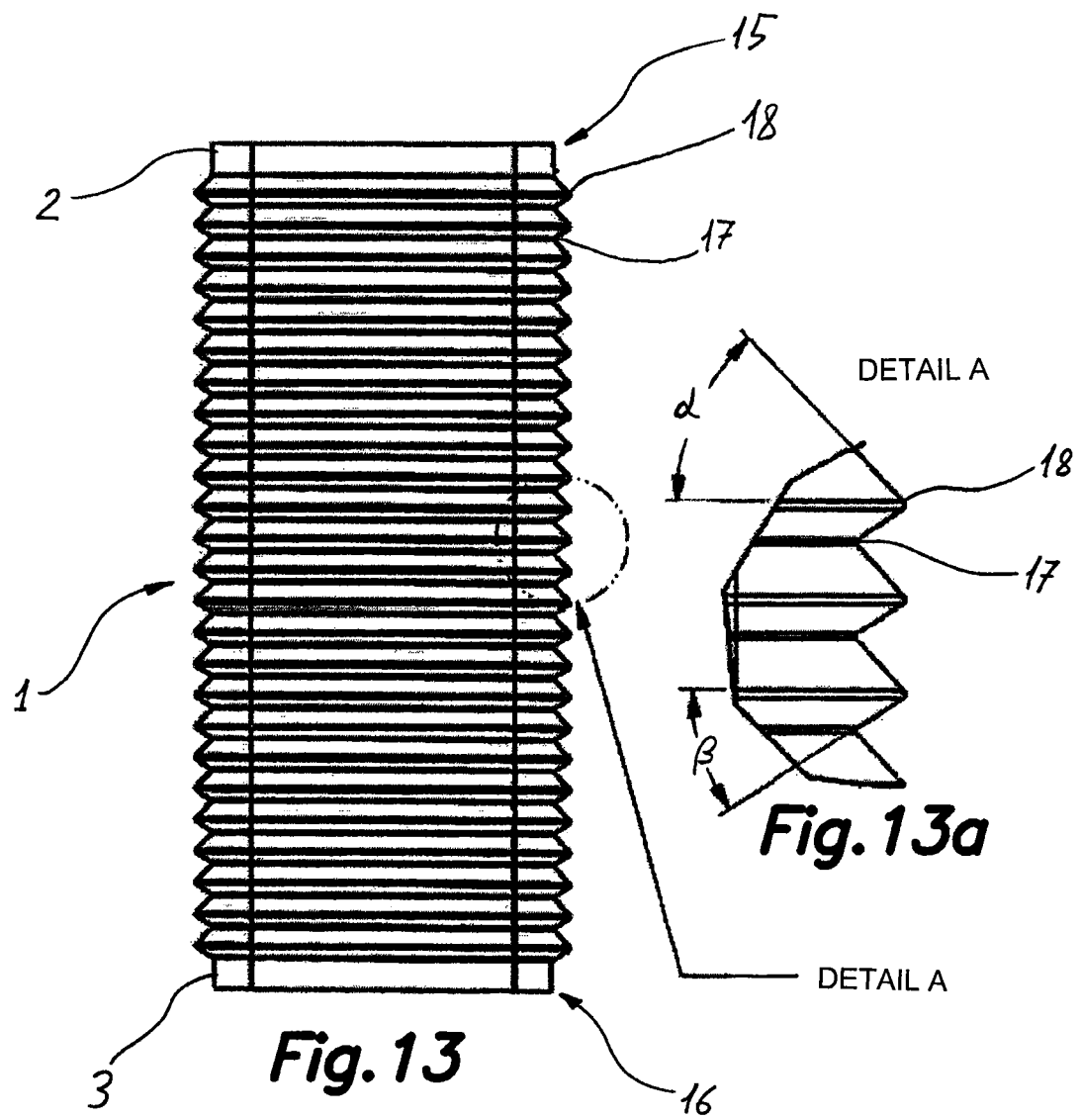
FIGS. 13 and 13a show elevational and detailed views respectively of the features of the wall with an asymmetric accordion structured applied in the hollow structure of the invention.

The detail of FIG. 13*a* shows the shape and different inclination of each the walls forming the accordion wall of the hollow structure 1, in this example the angles α have been identified with a value of about 47 degrees and β with a value of about 33 degrees.

A person skilled in the art can introduce variations and modifications in the embodiments shown and described without departing from the scope of the present invention as it is defined in the attached claims.

The invention claimed is:

1. A container assembly for windshield or headlight washing fluid in a vehicle, comprising in combination:
   an elongated tubular hollow structure demarcated by a wall with a plurality of asymmetric accordion folds, said asymmetric accordion folds being configured to arrange the tubular hollow structure in a stable retracted position and in a flexible extended position, and is able to contain an operational amount of windshield or headlight washing fluid;
   a filling opening located at an inlet end portion of the hollow structure;
   securing means for securing said inlet end portion and at least one section of the hollow structure located between said filling opening and a distal end to said engine compartment in an installation area; and
   at least one pump associated with said hollow structure and suitable for transferring contained fluid to a service point,
   wherein said folds are asymmetric and said asymmetric accordion folds being configured to make the tubular hollow structure able to be arranged in a stable retracted position and in a flexible extended position, and
   wherein said hollow structure further comprises an outlet port located at a distal outlet end portion of the hollow structure of said filling opening, a pump support joined to said outlet end portion being included and adapted to support a motor-driven pump such that a suction inlet of said motor-driven pump is communicated with said outlet port, the pump support comprising a cavity or receptacle in which the outlet port of the hollow structure ends, said suction inlet of the motor-driven pump being connected to an outlet of said receptacle.

2. A container assembly according to claim 1, wherein said inlet end portion is adapted to receive a lid for the filling opening.

3. A container assembly according to claim 1, further comprising securing means to fix said inlet end portion and said pump support to the engine compartment in an installation area with the filling opening at a higher level than the outlet port.

4. A container assembly according to claim 1, wherein said outlet of the receptacle is adapted to receive said suction inlet of the motor-driven pump through a pressure coupling with a sealing gasket.

5. A container assembly according to claim 1, wherein said securing means comprise several securing devices, each of which includes a flange means that can at least partly encircle a section of the hollow structure and a base adapted to be fixed to the engine compartment.

6. A container assembly according to claim 5, wherein said flange means of the securing device comprises a pair of elastic arms adapted to receive and secure by snap fitting with elastic deformation a section of the hollow structure in which said asymmetric accordion folds are formed.

7. A container assembly according to claim 1, wherein said securing means include a plurality of spaced flanges which can at least partly encircle several sections of the hollow structure and a base adapted to be fixed to the engine compartment.

8. A container assembly according to claim 1, wherein said securing means include at least one wedge configuration that can at least partly encircle a plurality of sections of the hollow structure and a base adapted to be fixed to the engine compartment.

9. A container assembly according to claim 1, wherein the hollow structure has a cross section selected from a group consisting of polygonal, quadrangular, rectangular, circular and oval cross section.

10. A container assembly according to claim 1, wherein the hollow structure is adapted to a windshield and headlight washing system, having in the extended position a capacity of between 2.5 and 6.5 liters.

11. A container assembly according to claim 1, wherein the hollow structure has in the extended position a capacity of between 2.5 and 3 liters.

12. A container assembly according to claim 1, wherein the tubular hollow structure comprises smooth sections each of which is formed between two sections provided with said asymmetric accordion folds, said smooth sections having a smaller transverse dimension than the maximum transverse dimension in the sections with folds, and a flange of the securing device comprises a pair of elastic arms adapted to receive and secure by snap fitting with elastic deformation one of the smooth sections.

* * * * *

UNITED STATES PATENT AND TRADEMARK OFFICE
CERTIFICATE OF CORRECTION

PATENT NO. : 8,671,977 B2  Page 1 of 1
APPLICATION NO. : 12/374695
DATED : March 18, 2014
INVENTOR(S) : Gonzales Sanz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1308 days.

Signed and Sealed this

Twenty-ninth Day of September, 2015

Michelle K. Lee
*Director of the United States Patent and Trademark Office*